Aug. 20, 1946.  W. E. SCOTT  2,406,166
INSTRUMENT FOR MEASURING REFLECTANCE
Filed July 25, 1942  6 Sheets-Sheet 1
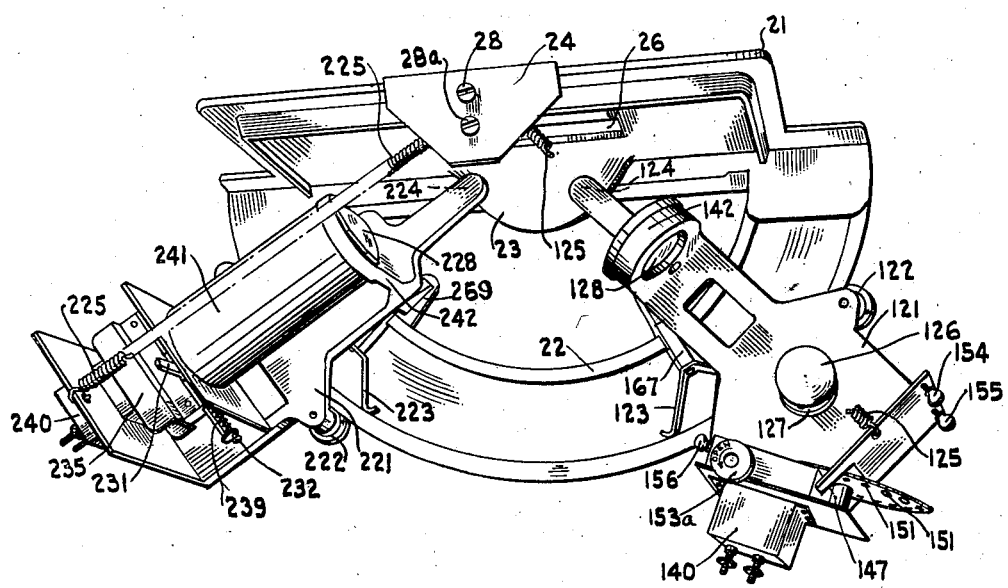
Fig. 2
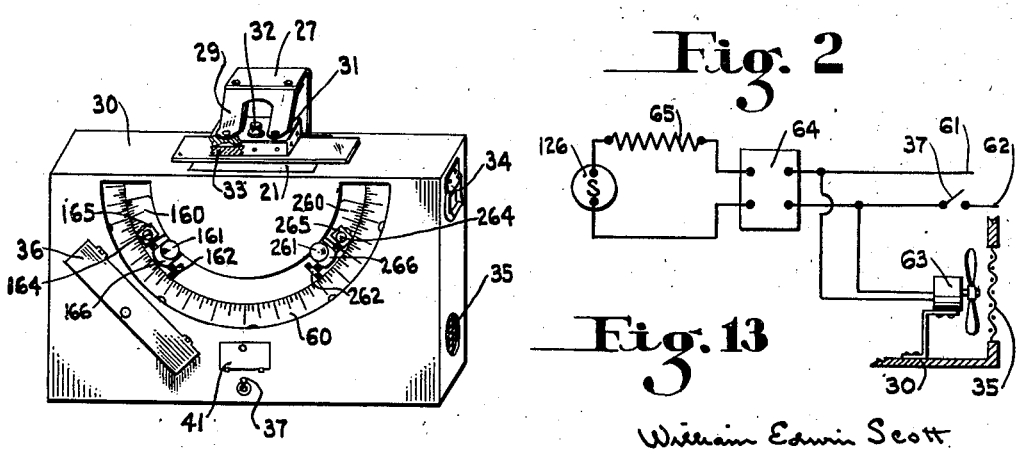
Fig. 1
Fig. 13
William Edwin Scott
INVENTOR Aug. 20, 1946.   W. E. SCOTT   2,406,166
INSTRUMENT FOR MEASURING REFLECTANCE
Filed July 25, 1942   6 Sheets-Sheet 2
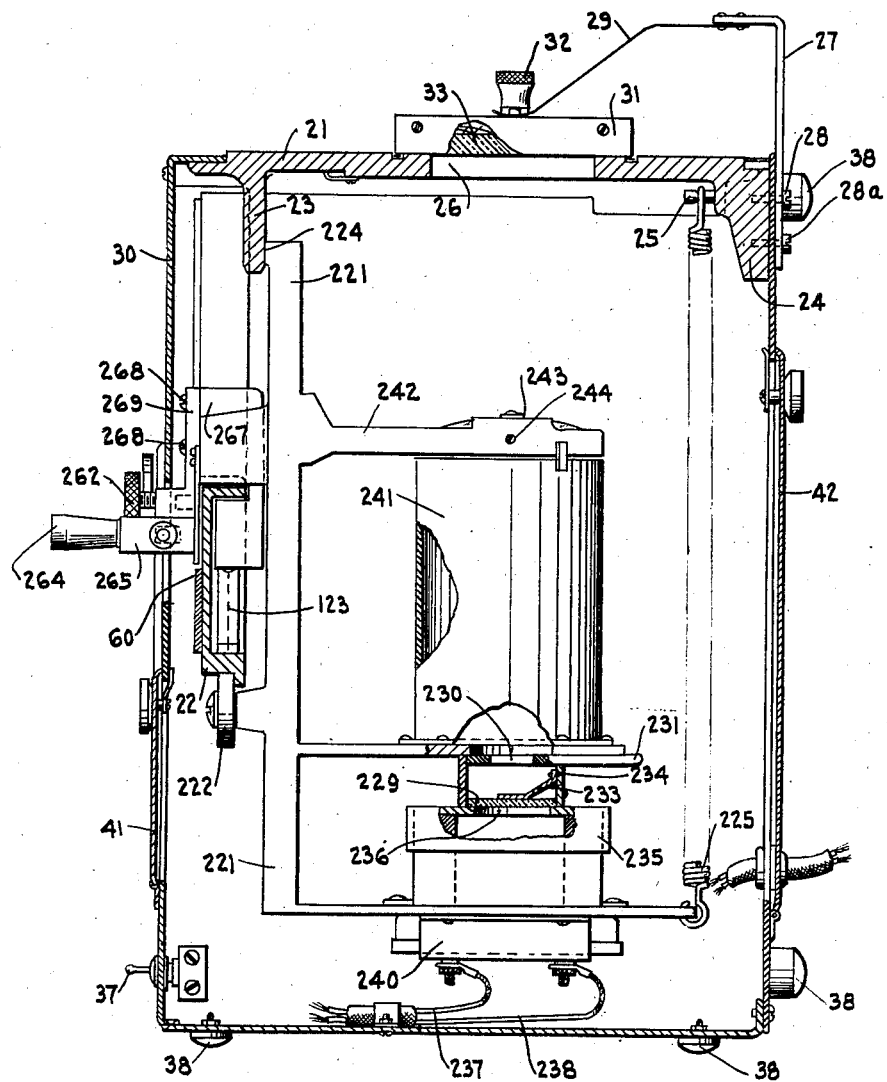
Fig. 3
Fig. 12
William Edwin Scott
INVENTOR
BY 

Aug. 20, 1946.  W. E. SCOTT  2,406,166
INSTRUMENT FOR MEASURING REFLECTANCE
Filed July 25, 1942  6 Sheets-Sheet 3

William Edwin Scott
INVENTOR

BY

Aug. 20, 1946.　　　W. E. SCOTT　　　2,406,166
INSTRUMENT FOR MEASURING REFLECTANCE
Filed July 25, 1942　　　6 Sheets-Sheet 4

William Edwin Scott
INVENTOR
BY

Aug. 20, 1946.  W. E. SCOTT  2,406,166
INSTRUMENT FOR MEASURING REFLECTANCE
Filed July 25, 1942  6 Sheets-Sheet 5
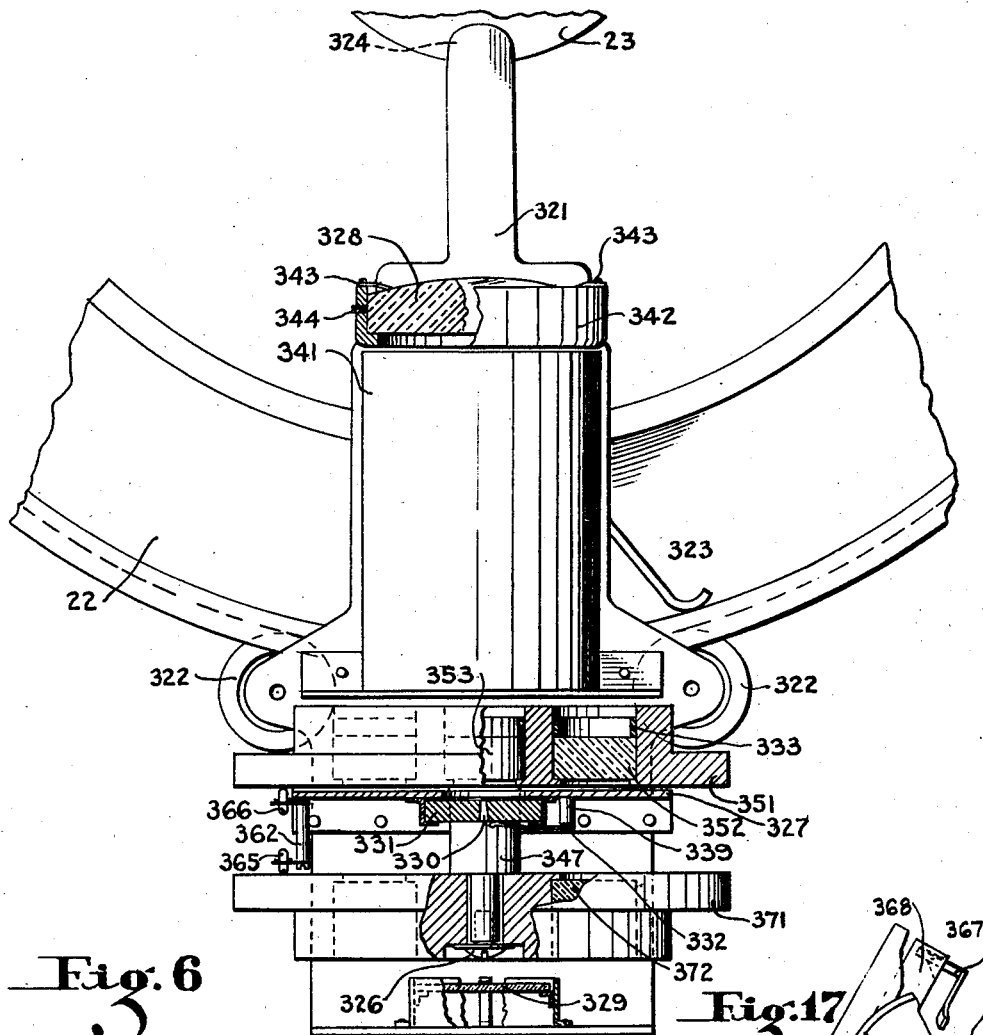
Fig. 6
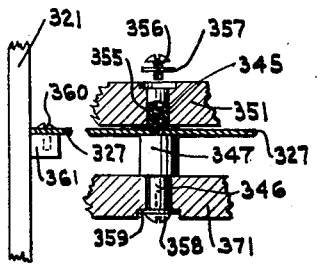
Fig. 15
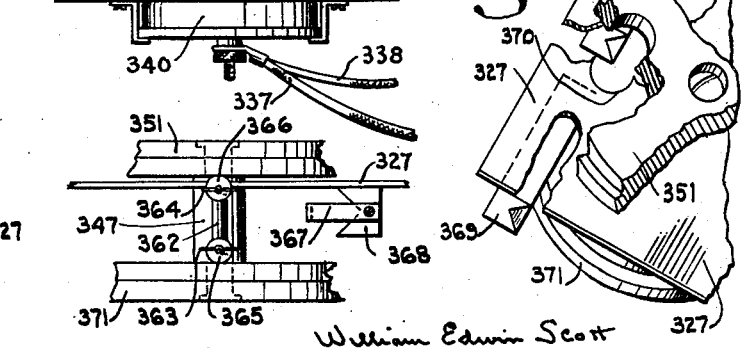
Fig. 16  Fig. 17
William Edwin Scott
INVENTOR
BY 
ATTORNEY Aug. 20, 1946.　　　　W. E. SCOTT　　　2,406,166
INSTRUMENT FOR MEASURING REFLECTANCE
Filed July 25, 1942　　　　6 Sheets-Sheet 6

William Edwin Scott
INVENTOR

BY

Patented Aug. 20, 1946

2,406,166

UNITED STATES PATENT OFFICE 2,406,166

INSTRUMENT FOR MEASURING REFLECTANCE

William Edwin Scott, Drexel Hill, Pa., assignor to E. I. du Pont de Nemours & Company, Wilmington, Del., a corporation of Delaware Application July 25, 1942, Serial No. 452,325

8 Claims. (Cl. 88—14)

This invention relates to goniophotometry, colorimetry, and the like. More particularly it appertains to an accurate and easily operated instrument for evaluating, by photoelectric means, the light reflected from a surface.

In the manufacture of finishes, paper, plastics, coating compositions, etc., the gloss, color, opacity, reflection transmission and the like, are of great interest. Control of these properties is most important, because acceptability is, to a considerable extent, dependent thereon. It is believed that adequate attention has not heretofore been directed to such matters, because of lack of suitable instruments. Visual observation has been utilized extensively, but it does not provide adequate means of recording exact reflection characteristics, and furnishes only a meager and unreliable basis for comparisons. The problems and factors involved in this field are described by Wetlaufer and Scott in an article entitled "Measurement of Gloss" in the November 15, 1940 (volume 12, No. 11) issue of the Analytical edition of Industrial and Engineering Chemistry, pages 647 to 652. Reference may be made thereto for details.

The primary object of this invention was to provide a sturdy instrument for the measurement of gloss which would be reasonably accurate, simple to operate, and suitable for industrial plant control. Other objects were to provide an instrument for evaluating with a photoelectric cell the light reflected from a surface; to provide an instrument capable of making reflection measurements at any location on a sample, regardless of its size, and to provide an instrument with which measurements in terms of a standard or measurements in terms of an established or accepted system, could be made directly, or with a minimum of calculation, from the actual readings of the instrument. Still other objects will be apparent from the following more detailed description.

It has now been found that arranging a collimator, light source and photoelectric cell receptor to rotate about a common (but imaginary) axis lying in the front surface of a sample without having direct physical connection with or near this axis, in the manner described in detail hereinafter, accomplishes the foregoing objects and enables a great variety of desirable measurements, based upon light reflected from the sample, to be made.

How the foregoing objects and related ends are accomplished will be apparent from the following exposition, in which are disclosed the principle and divers embodiments of the invention, including the best mode contemplated for carrying out the same. The written description is amplified by the accompanying drawings, in which:

Figure 1 is a front perspective view of the goniophotometer-colorimeter;

Figure 2 is a rear perspective view of the collimator and receptor arms and their supporting frame, removed from the housing;

Figure 3 is an end elevation view, partly in section, of the goniophotometer receptor, the supporting frame and associated portions of the housing;

Figure 6 is a fragmentary rear elevation view, partly in section, of a combined goniophotometer and colorimeter receptor;

Figure 12 is a fragmentary perspective view of the positioning and clamping structure of the collimator arm;

Figure 13 is a wiring diagram for the light source and cooling fan;

Figures 15 and 16 are fragmentary elevation views, partly in section, of the colorimeter receptor; and Figure 17 is a fragmentary perspective view of the tube holding arrangement on the colorimeter receptor.

GENERAL FEATURES

The present invention is designed to illuminate a surface and measure, photoelectrically, the distribution of the light reflected therefrom. The primary elements of the instrument are, as will be clear from Figure 2, a frame member 21 which supports the sample being measured, a collimator, the supporting arm of which is indicated generally at 121, and a receptor having a similar supporting arm. Interchangeable receptors, one for simple goniophotometric measurements whose supporting arm is shown at 221, and one for securing either colorimetric or goniophotometric data, whose supporting arm is shown at 321 in Figure 6, are contemplated.

Figure 4:
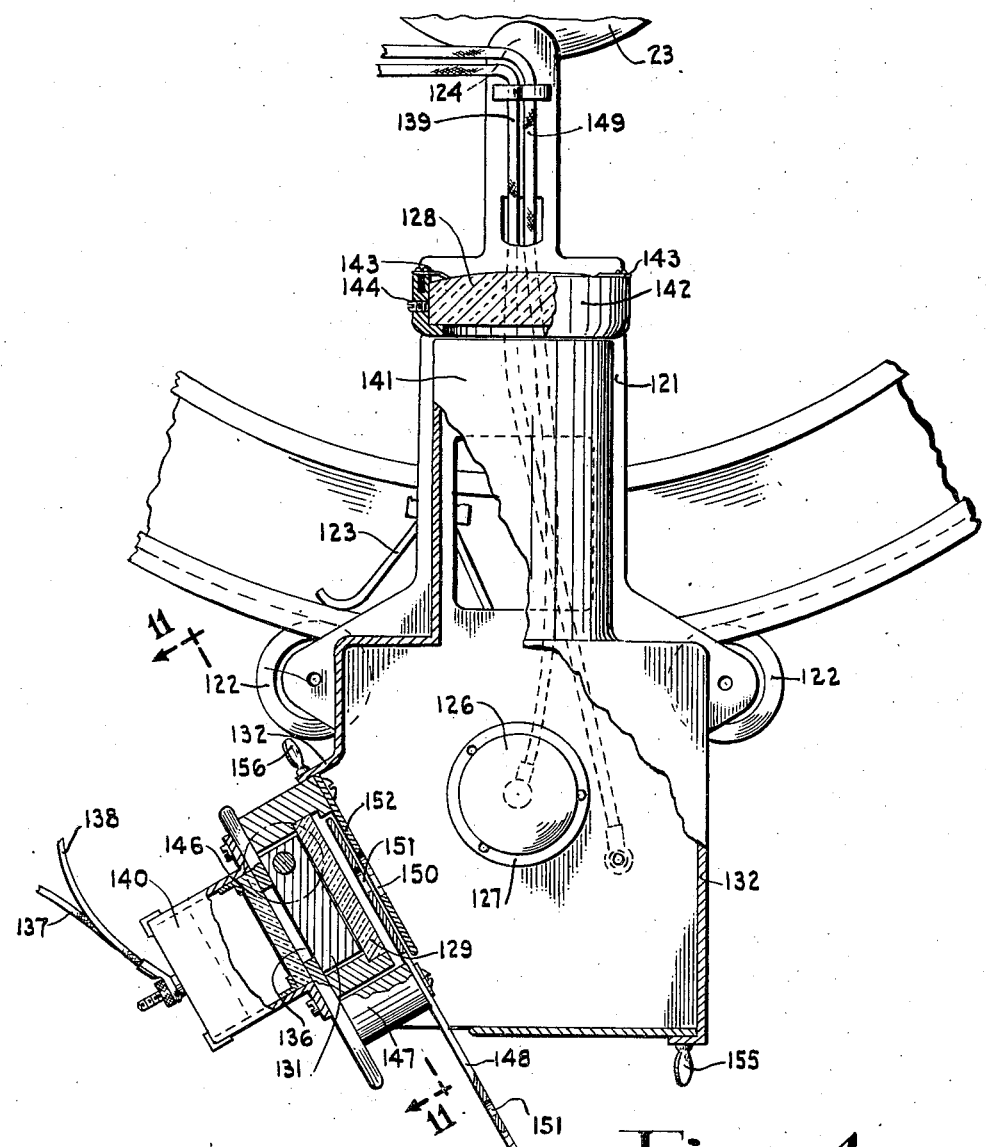
Figure 4 is a fragmentary rear elevation view of the collimator and its supporting arm, with some parts removed and some parts in section.

The collimator and receptor units are also supported by the frame. The supporting arrangement involves, for each element, five points of movement restraining contact and one degree of freedom, and comprises ball bearing rolls 122, 222 and 322 (Figures 4, 5 and 6) on the arms 121, 221 and 321, moving in a flanged arcuate guide or track 22 integral with the frame, bosses 124, 224 and 324 sliding on the semi-circular extension 23 comprising an integral part of the frame and springs such as 125 and 225, hooked to the outward part of the arms 121, 221 and 321, and over the pin 25, carried by a projecting stud or pin 24 on the frame.

The collimator and receptor arms move in a plane (the one degree of freedom) in one arc, the center of which is located in the front face of said sample over the aperture 26 in the frame 21. The coil springs, such as 125, cause each of the rollers, such as 122, to have a centripetal as well as lateral pressure on the track 22 and its radial flange. The two rollers on each arm therefore provide four of the five guiding contacts. The fifth is in the boss, such as 224 (Figure 3).

The frame 21 is secured to the upper part of a housing 30. The top of the housing and upper surface of the frame are substantially flush, the housing being cut away to allow the surface being measured to rest directly on the frame. An aperture 26 in the table or sample supporting portion of the frame 21 permits the light from the collimator to illuminate the sample and be reflected into the receptor.

A spring clamp, comprising angle piece 27 screwed to the back of the frame 21 by screws 28 and 28—a (Figures 2 and 3), a bent spring steel strip 29, and a block 31 to which the projecting fingers of the spring 29 are loosely connected by rivets, are provided for holding the sample in position on the table 21 while it is being measured. A knurled knob 32, secured to the top of the block 31, provides a finger grip by which the block 31 can be raised against the spring 29 to free the sample. For convenience, the lower surface of the block 31 may comprise a piece of black plate glass 33 or other suitable material which can be utilized as a standard for relative measurements.

The housing has conventional handles, as shown at 34, on its opposite ends, by which the apparatus can be lifted and transported. Rubber buttons 33, located near the corners of the housing, serve to support the instrument with its sides out of contact with the surface upon which it rests. As shown in Figures 1, 3 and 13, a switch 37 is used to turn on and off the collimator light source 126 (I. C. I. illuminant A) and ventilating fan 63, located inside the housing. A grating 35 in one end of the housing adjacent this cooling fan allows access of air thereto.

Figure 11:
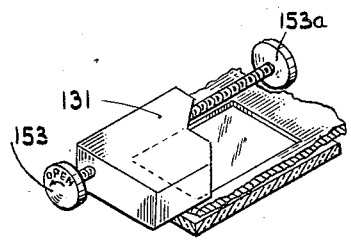
Figure 11 is a fragmentary perspective view of the compensating photoelectric cell slit and associated parts corresponding to an elevation view along the line 11—11 of Figure 4.

A hinged door 36 allows the operator access to the adjusting knob 153 which operates the compensating photoelectric shutter (Figures 4 and 11), described hereinafter. The door 41 serves the same purpose. General access to the interior of the housing is possible through door 42 in the back.

The housing 30 has an arcuate slot through which there is presented, on the front of the track 22, a graduated annular section or arc 60 and associated smaller concentric graduated vernier arcs such as 160 and 260 on the collimator and receptor arms. As indicated in Figure 12, these arcuate vernier plates carry posts such as 165, terminating in a knob 164. Corresponding parts such as 264 and 265 are carried by the receptor arms. The arms within the housing are moved to various positions on the track 22 by means of these knobs 164 and 264 which, because they project outside the housing, are easily accessible.

Vernier screws 162 and 262 are threaded through posts 166 and 266 and swiveled in posts 165 and 265. Straddling the track 22 and connected to the arms through these vernier screws are clamps which hold the arms at the desired location. These clamps bear a mere mirror image relation, that is, the receptors have clamps similar to those of the collimator, but with the parts in reversed position. A description of the clamp shown in Figure 12 will suffice to explain the operation of all the clamps and verniers. This clamp comprises back piece 167, carrying a spring 123, and a front piece 169, carrying the post 166. The back and front pieces are held together by screws 168. This arrangement, with the assistance of the spring 123, provides a satisfactory sliding fit over the track 22. A knurled head tightening screw 161, threaded through post 166 at right angles to the screw 162, acts as a set screw to hold the clamp in a fixed position on the track.

As will be clear from the foregoing, the rough adjustment or positioning of the arm is secured by moving the arm as near as possible to the desired position by means of the knob 164, and tightening the screw 161. Thereafter the fine adjustment is secured by turning the vernier screw 162.

Current for the light source is supplied from a voltage regulator 64 located inside the housing 30 at the end opposite the fan 63.

THE RECEPTOR

Figure 5:
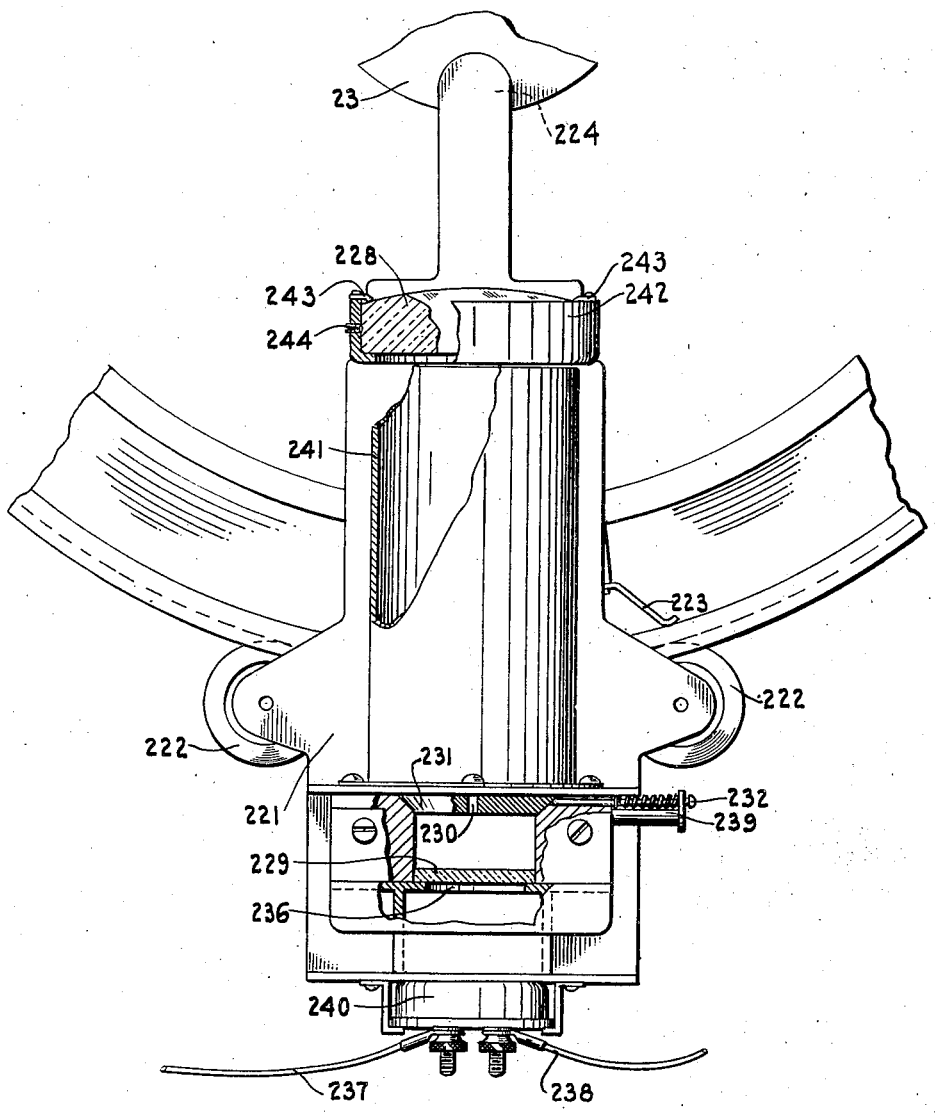
Figure 5 is a rear elevation view, partly in section, of the receptor and its supporting parts.

The receptor shown in Figures 2, 3 and 5 comprises, in addition to the lens 228 which collects the reflected light, and barrier type photoelectric cell 240 whose response to this light is measured, a filter 229 having a ground glass side for diffusing the light over the active surface of the photoelectric cell, and a slit 230 in the metal slide 231. This slit is located at the focus of the lens 228 and is maintained in position by the slide's guide and spring pressed pin 232. The spring and pin are supported by bracket 239. Usually a series of slides with slits of different widths is supplied with the instrument.

One or more spring clips 233 (Figure 3), secured to the removable front 234 on the upper portion of the photoelectric cell housing 235, maintain the filter 229 in position over the circular aperture 236. For gloss measurements, this filter is a glass which converts I. C. I. illuminant A (the light source 126) to I. C. I. illuminant C, and causes the photoelectric cell response to be equivalent to I. C. I. primary Y value.

The wires leading from the photoelectric cell 240 to the resistance box are indicated at 237 and 238. The light-tight tube or shield above the space between the lens and the frame containing the slit, filter, aperture and photoelectric cell, is indicated at 241.

The lens 228 is held in its position in the lateral extension 242 on the frame 221 by a series of clips 243 and set screw 244. A spring 223 on the clamp for securing the receptor arm at a given position, cooperates with the other structural items to keep the receptor arm properly positioned on the track 22.

THE COLLIMATOR

The collimator frame 121 carries the light source (I. C. I. illuminant A), for example, a prefocus bulb of about 40 candlepower (5 volts, 6.5 amperes), on support 127, which permits adjustment of the position of the lamp. In addition, the collimator arm carries a compensating photoelectric cell 140 and associated light regulating screens. A light-tight shield 132 (not shown in Figure 2) covers the light source so that illumination of other parts of the apparatus is prevented, and stray light is prevented from impinging on the photoelectric cell 140.

The compensating photoelectric cell 140 is located at one side of the supporting frame instead of along its radius, as was the case in the previously described receptor. The collimator has, in addition to the rollers 122 which bear against both the arcuate base and flange of the track 22, a number of other structural features similar to the receptor, for example, a lens 128 positioned by clips 143 and set screw 144 in the lateral extension 142, spring 123, and tubular light shield 141. This light shield is made integral with a somewhat cubical-shaped shield 132 which covers the light source 126. Wires 139 and 149 supply current from the voltage regulator to the light source. The lens 128 provides a parallel beam of light for illumination of the sample being evaluated, and directs it thereon.

The difference in the amount of light which would fall on the receptor photoelectric cell and the compensating photoelectric cell, is fairly large. The compensating cell is associated with a light regulating arrangement capable of considerable adjustment. In this device an ordinary piece of glass 146, ground on one side to diffuse the light over the surface of the compensating photoelectric cell, is located between the aperture 136 and the active surface of the cell. A blue heat-absorbing glass 129 is preferably ground on one side, also, for light diffusion purposes. A post 147 supports a rotatable disc 148 which contains near its outer edge a series of graduated holes 151. A rough adjustment of the amount of light falling on the compensating photoelectric cell can be obtained by rotating the disc 148 until an aperture of suitable size is located under the aperture 150 in the cover 152. The final adjustment is obtained by a single jaw slit or slide 131 positioned by means of a screw having knurled knobs 153 and 153—a on opposite ends. By having two knobs, adjustments may be made through either the front or back of the housing 30.

The leads from the compensating photoelectric cell to the resistance box are shown at 137 and 138. Thumb screws 154, 155 and 156 secure the light shield 132 in proper position relative to the other parts of the collimator.

THE VOLTAGE REGULATOR

The voltage stabilizer is of the conventional magnetic type (U. S. A. Patents 1,985,634–5, 2,254,918 and 2,278,261). It consists of two transformers with the primaries in series, one of which operates at high magnetic density. The transformer with the higher saturation is partially resonated by means of a condenser. The secondaries are connected in series opposed. This type of device is so well known that a more detailed description is considered unnecessary. It should be capable of continuously furnishing a voltage of 6 volts±.5% from a line having a voltage fluctuation in the range 90 to 130, and a constant frequency.

The wiring arrangement is illustrated in Figure 13. Ordinary municipal A. C. light current at 115 volts is taken from the line at terminals 61 and 62. The switch 37, as previously indicated, controls the voltage regulator 64 and the ventilating fan 63.

THE LIGHT SOURCE

In order to operate the light source 126 at the desired color temperature (I. C. I. illuminant A), it is practically necessary to incorporate a resistance 65 in series therewith. In practice, a standardized unit, consisting of a lamp and the proper resistance, is supplied.

THE PHOTOELECTRIC CELLS

There is no need to burden this specification with details of the photoelectric cell construction and operation characteristics. These are well known in the art, and are readily available in such works as Photoelements, by Lange (St. John translation published by Reinhold in 1938), and Photoelectric cell applications, by Walker and Lance (third edition published by Pitman in 1938). The barrier layer type photoelectric cell is employed in the present invention. Preferably the selenium (on iron) barrier construction is used.

THE GALVANOMETER

Galvanometer construction is well understood by those skilled in the art, and a detailed description would be unnecessary for an understanding of the present invention. The galvanometer employed is preferably of the low resistance type having a resistance low relative to the decade resistances and both the compensating and measuring photoelectric cell internal resistances. A zero center taut suspension galvanometer having an enclosed multiple reflection system is desirable, since this type is sufficiently sturdy for industrial plant work. The preferred instrument is a zero center D. C. high sensitivity galvanometer with a resistance of 40 ohms, a sensitivity per millimeter division of 0.01 microampere, with an external critical damping resistance of 225 ohms.

THE PHOTOELECTRIC CELL CIRCUIT

Figure 7:
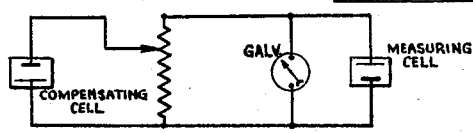
Figure 7 is a simplified wiring diagram for the measuring and compensating photoelectric cells.

The principles and requirements of circuits for balancing opposed photoelectric cell currents are well known, and in the interest of brevity reference is made to the literature, including: (a) L. A. Wood—"A differential circuit for blocking-layer photo-cells," R. S. I., 5, 295 (1934); (b) L. A. Wood—"Zero-potential circuit for blocking-layer photo-cells," R. S. I., 7, 157 (1936); (c) B. A. Brice—"A compensating circuit for blocking-layer photoelectric cells," R. S. I., 8, 279 (1937); and (d) U. S. A. Patent No. 2,064,517, for a general discussion of the same. A simple illustrative circuit is shown in Figure 7.

Figure 8:
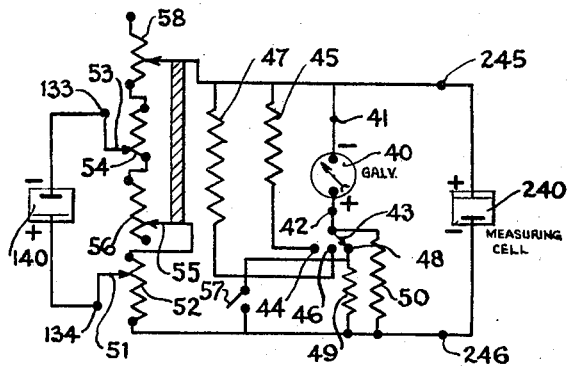
Figure 8 is a wiring diagram of the preferred photoelectric cell-galvanometer circuit.
Figure 14:
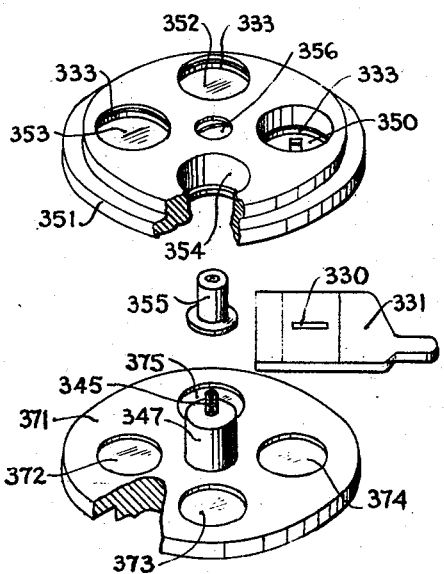
Figure 14 is a fragmentary perspective view of some of the elements of the colorimeter receptor shown in Figure 6.
Figure 9:
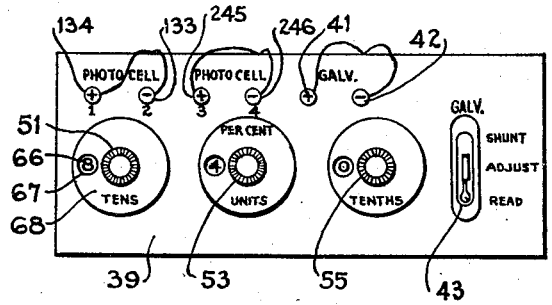
Figure 9 is a plan view of the panel of the circuit control unit in which the resistance elements used in balancing the circuit are mounted.

The preferred photoelectric cell circuit is illustrated in Figure 8, wherein 240 indicates the receptor photoelectric cell, 140 the compensating photoelectric cell, and 40 the galvanometer. The resistances, switches, etc., for the same are incorporated in a so-called "decade" box 39 (Figure 9), the positions of the binding posts of which are shown at 41, 42, 133, 134, 245 and 246 in the wiring diagram.

The switch 43 on the control box 39 has three positions, 44, 46 and 48, marked "Shunt," "Adjust" and "Read," respectively. The switch position marked "Shunt" is used to give the lowest galvanometer sensitivity, and corresponds, in the wiring diagram, to the switch being closed to position 44, thereby incorporating the resistance 45 in the circuit. This position is used in making the initial balancing adjustment, either during standardization or the measurement of successive samples. With the switch in this position, the galvanometer is adjusted as closely as possible to zero by means of the compensating photoelectric cell shutters. The resistance 50 is included in the circuit to give additional protection to the galvanometer during the preliminary adjustments. Thereafter, the switch is moved to the "Adjust" position, closing through contact 46, thereby substituting the resistance 47 for the resistance 45 in the circuit. The resistance 47 is greater than the resistance 45, so that with the switch in this position more current flows through the galvanometer, making the indicating set-up more sensitive. With the switch in this position, the galvanometer is again brought to zero with the compensating photoelectric cell shutters.

In the third setting, "Read," the switch is connected through the position 48. The resulting circuit includes a resistance 49, utilized to provide better damping characteristics, and the measuring or balancing resistance units ("decades") 52, 54 and 56. Resistance 49 can be removed by closing switch 57 to provide greater sensitivity, if necessary.

Figure 10:
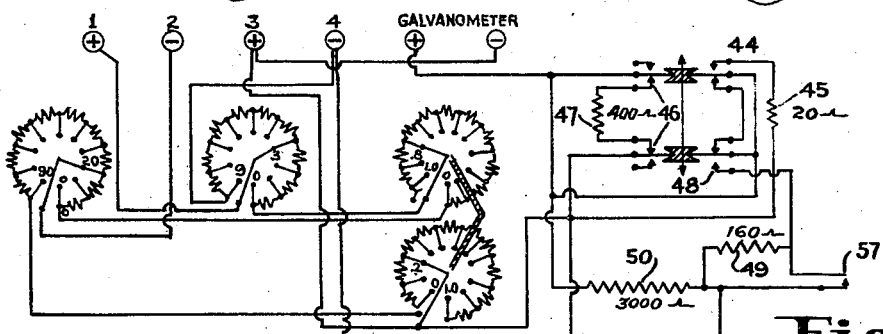
Figure 10 is a wiring diagram for the decade resistance box.

Each resistance unit is made up of accurately calibrated sub-divisions, as shown in Figure 10. The knob 51 is on a shaft carrying the contact which controls the nine subdivisions of ten ohms each. This shaft, like those carrying the knobs 53 and 55, carries a dial 66 readable through the hole 67 in the shield or cover 68. The shaft carrying knob 53 similarly controls nine one ohms units, and the shaft carrying knob 55 controls two separate series of ten 0.1 ohm resistances each.

Consideration of the wiring diagram in Figure 8 will make it clear that the external resistance of the measuring photoelectric cell 240 is influenced by the portions of the decade resistances 52, 54 and 56 in the circuit. For best results it is desirable that the external resistance of this cell not vary during the measurements. The resistances 52 and 54 are connected so that the knobs 51 and 53 can be used to vary the resistance in the compensating cell circuit without varying the aforementioned external resistance. Because it is not possible to conveniently connect the resistance 56 to bring about a similar result, the shaft which carries the knob 55 has a second decade resistance 58 having the same characteristics as the resistance 56. With this arrangement, any resistance removed from the circuit of the measuring photoelectric cell by rotating the knob 55 is added in the resistance unit 58, thereby keeping the measuring cell external circuit resistance constant.

THE DECADE RESISTANCE BOX

The wiring diagram for the decade resistance box is shown in Figure 10. This diagram is believed to be self-explanatory. The operation of the box will be clear from the explanation of the photoelectric cell circuit.

THE COLORIMETER

A substitute receptor, which can be used to make color measurements as well as gloss measurements, is shown in Figure 6. The general features of this receptor are similar to those of the receptor of Figure 5, including a supporting arm 321 maintained in position on the track 22 by means of rollers 322, a boss 324 riding on the extension 23, and a coil spring similar to spring 225 in Figure 3. This arm has a clamping and vernier arrangement including a spring 323 similar to that previously described. The focusing lens 328 is held in position in the extension 342 by means of clips 343 and set screw 344. The light-tight tubular shield is shown at 341. The photoelectric cell shown at 340 and having leads 337 and 338, is mounted in a manner similar to the cell 240. Over the cell 340 there is a housing containing a piece of plain glass 329 ground on one side to diffuse the light over the photoelectric cell surface.

This receptor differs from the goniophotometer receptor in having an additional lateral extension 327 which is a separable plate secured by screws 360 to the extension 361 on the arm 321. Centrally of this plate is an aperture through which there extends a threaded stud 345 on the post 347. The post is held in position by the nut 355 on this stud. This nut acts as an axle and bearing for a disc 351. The end of the post 347 opposite the stud carries a similar axle 346 for the disc 371. These discs are held in position on these axles by means of screws 356 and 358, and washers 357 and 359.

The plate also carries on its under side a post 339 which in turn carries a spring clip 332. A slide 331 with a slot 330 corresponding to the slide 231 is held against the plate by means of this spring clip.

The upper disc has four holes which by rotation of the disc can be positioned over the slot 330 and in line with the path of the light from the lens 328 to the photoelectric cell 340. The plate 327 has an aperture 370 which permits the passage of light in this line. One of these holes 354 is vacant, allowing the lens to focus the reflected light on the slot 330 for gloss measurements. A second hole contains a slit 350 which is used in measurements involving liquids, in the manner described hereinafter. The third hole 352 contains a filter for converting the light from the source (I. C. I. illuminant A) to I. C. I. illuminant C. The fourth hole comprises a filter 353 for converting the I. C. I. illuminant A to I. C. I. illuminant B. The specifications for these illuminants are given in Commission Internationale de L'Eclairage en Succession a la Commission Internationale de Photometrie Huitieme Session—Cambridge—September 1931 (Recusil des Travaux et Compte Rendue des Seances, Cambridge University Press—1932), and are also found on page 16 of the Handbook of Colorimetry (1936—Technology Press), prepared by the Color Measurement Laboratory at the Massachusetts Institute of Technology.

These glass filters are held in position in the holes by a bottom ridge formed in the disc 351 and a ring, for example, 333, pressed into the hole over the filter. The lower disc 371 also has a series of holes which register with the holes in the upper disc 351 and the path of the light between the lens and the photoelectric cell. The two discs are arranged for separate rotation so that any desired combination of apertures may be interposed between the photoelectric cell and the lens. Each of the holes in the disc 371 has a glass filter. These may for convenience be referred to as $X_1$, $X_2$, Y and Z, and are indicated by the numerals 372, 373, 374 and 375. They are utilized in obtaining tristimulus values for colorimetry.

The colorimetry measurements are based on the I. C. I color system which is defined by a set of three curves or functions known as X, Y and Z. The X curve has two maxima, and since it is impractical to manufacture a filter corresponding to such a color sensitivity, two correcting filters, one to obtain the long wave length part and the other the short wave length part of the X function, are used.

In order to measure the color of transparent liquids, the receptor arm is arranged to hold a standard cylindrical Cargeille tube (diameter 10.60 mm.) of the sample. The holding arrangement comprises a spring clip 367 secured to a block guide 368, which in turn is secured to the plate 327, and an opposed positioning device consisting of rollers 365 and 366 held against the discs 371 and 351, respectively, by spring members 363 and 364, which are in turn mounted on a post 362 secured to the plate 327. A duplicate trough or block 369, in line with the block 368 and on the opposite side of the plate 327, is provided to furnish additional support. The tube containing the liquid to be evaluated is slipped lengthwise into the path of the light from the lens 328 between the rollers 365 and 366 and the clip 367.

The Cargeille tube is the type commonly employed in color and viscosity determinations with varnish, etc.

EXAMPLE I

*Light distribution measurement*

The receptor filter and photoelectric cell should be selected to give a response corresponding to the average human eye (I. C. I. primary Y). Set the collimator at the desired angle of illumination on the graduated circle arc. In the preferred operating procedures this will be 45° incidence for high and semi-gloss finishes, and 67.5° for eggshells and flats, but other angles, dependent upon the desires of the operator and the specific measurement problem can be utilized satisfactorily. Rotate the receptor to a position where the light received by the measuring photoelectric cell is a maximum, as indicated by the measuring circuit. At this position the angle of the receptor, read from the graduated arc, should correspond to the angle of illumination if the parts of the instrument are in optical alignment.

Set the dials of the decade resistance to the value assigned to the black polished plate glass standard (33), and adjust the shutter over the compensating photoelectric cell to give a zero deflection on the galvanometer. This completes standardization of the instrument. The value assigned to the polished black glass or other standard may be arbitrary, or may be in terms of some hypothetical standard such as a perfect mirror.

Set the receptor arm at various angles from a position adjacent to the collimator arm to a position as far removed as possible from it. The steps or angle positions, which can readily be determined empirically, should be sufficiently small to furnish adequate data from which an accurate angular distribution curve may be plotted. At each of the receptor settings readjust the decade dials to bring the galvanometer to zero. Depending upon the purpose of the operator, the whole or only a portion of the distribution curve need be determined. The resultant readings of the dials are used in plotting the distribution curve of the reflected light. When the colorimeter receptor is used, the I. C. I. illuminant C filter (daylight) in the upper disc and the I. C. I. primary Y filter should be in registry with the path of the reflected light.

EXAMPLE II

*Relative brightness measurement*

Replace the standard black glass surface, mentioned in Example I, with a magnesium oxide surface or other standard, and remove the receptor slide (231 or 331). This greatly increases the sensitivity of the instrument (in brightness measurements) without sacrificing accuracy, because the distribution of reflected light for angles close to normal is uniform. The aperture sum without the slit is still small enough to preclude specularly reflected light from the measurement. For the measurement of opaque materials, set the collimator at an angle of 45°, and the receptor at 0° (conditions recommended by the International Commission on Illumination).

Set the decade dials at the selected value corresponding to the standard, and bring the galvanometer to zero by adjustment of the shutters over the compensating photoelectric cell, as described in Example I. With the instrument thus standardized, replace the standard with a sample to be compared therewith, and restore balance of the galvanometer with the decade dials. Repeat this operation with each of the samples to be measured. The readings of the decade dials give relative brightness of the samples with respect to the standards. If desired, these values can be converted to absolute brightness.

EXAMPLE III

*Hiding power measurement*

The hiding power of a coating composition can be expressed by the ratio of the brightness of the coating over a black surface to the brightness of the coating at the same thickness over a white surface. This is commonly referred to as the "contrast ratio."

Doctor a coating of equal thickness of a composition whose hiding power is to be determined on a black plate glass base and on a white plate glass base. Using the collimator and receptor settings and suitable standard, as described in Example II, set the decade dials at the desired value and bring the galvanometer to zero by adjustment of the shutters over the compensating photoelectric cell. Replace the standard with the coated black glass and restore the balance of the galvanometer with the decade dials. Replace the coated black glass with the coated white glass, and again restore the balance of the galvanometer with the decade dials. The hiding power is given by the ratio of the black glass reading to the white glass reading.

EXAMPLE IV

*Color measurement of opaque material*

As in Example II, set the collimator at an angle of 45° and the colorimeter receptor at 0° (or vice versa) and remove the slide 331. Select the desired illuminant by rotating the upper disc to the proper source conversion filter: Aperture 370 for illuminant A (the light source), filter 352 for illuminant C (average daylight), or filter 353 for illuminant B (mean sunlight). Place the opaque sample whose color is to be evaluated in position, and determine its tristimulus values by interposing, in succession, each of the four filters, corresponding to the I. C. I. primaries, in the lower analyzer disc. The primary X value is obtained by adding the $X_1$ and $X_2$ decade dial readings.

The decade readings obtained in this way will be direct if the circuit is balanced for each filter using a standard whose tristimulus values are known. Preferably white magnesium oxide is used as a standard in such cases. By repeating the operation with other illuminants it can be determined whether or not samples which match or do not match under one illuminant will match or not match under another illuminant, and whether the color difference (if any) will remain constant or become larger or smaller.

Although, generally, the standard is immaterial it is preferred to use a white material such as the usual magnesium oxide standard, white plate glass, or some other white glass whose tristimulus values have been determined.

As indicated above, separate standardization is required for each filter-photoelectric cell combination. This standardization is made by adjusting the shutter and slit over the compensating cell.

EXAMPLE V

*Color measurement of transparent liquids*

The color of transparent liquids is determined in a manner somewhat similar to the procedure described in Example IV. The collimator is set at 45° and the receptor at 0° (or reciprocal conditions), the slit 331 is removed, and the slit 350 in the upper disc rotated into position in front of the photoelectric cell with its long axis in the plane of the collimator and receptor axis. The tube with the liquid to be evaluated is inserted in position between the photoelectric cell and the aforementioned slit, with its axis parallel to the slit. This slit is used to limit the light beam to the center of the cylindrical sample tube, whereby the lens effect of the tube is eliminated.

The tristimulus valves are determined in the manner previously described by successive positioning of the four filters in the analyzer disc in the beam of light falling on the photoelectric cell. To make the instrument direct reading, the circuit should be balanced, with the slit and shutter over the compensating cell for each filter, using a standard whose tristimulus values are known.

It is advisable to have the illumination on the measuring photoelectric cell as uniform as possible over the whole area of the sensitive surface. This precaution is apparently not so important in the case of the compensating cell. It is necessary to insure that no infra-red radiation reaches either photoelectric cell.

It will be obvious that the filter for changing the illuminant A (the tungsten lamp light source, operating at 2848° K.) to illuminant B or C could be placed in the light path before the light strikes the sample to be measured. In most cases the results would be similar to those obtained with the filters in the positions shown in the drawings. In colorimetry, samples which fluoresce are sometimes encountered, and if the tristimulus filters were between the light source and the sample, correct readings would not be obtained in such instances. Locating these filters over the measuring photoelectric cell therefore results in a greater range of accuracy as well as a convenience in construction. Errors due to fluorescence of the sample are eliminated when the filter is located close to the photoelectric cell, as shown.

It is necessary to take into account the variation in color temperature of the lamp with age, or to maintain the proper color temperature by replacing the lamp at suitable intervals. The photoelectric cells also must be renewed from time to time. The filters, being of glass, are permanent.

The lenses 128, 228 and 328 should be achromatic. The color of the lenses is taken into account in determining the properties of the filters. This makes for more accurate colorimetry and a closer approach to the I. C. I. tristimulus standards. The instrument's utility would not be greatly curtailed if the filters were not able to bring about perfect duplication of the distribution curves of the I. C. I. standards. In such a case the results would be reproduceable, and although the instrument as it existed would not be exactly the same as the I. C. I. standard, it would be close and represent a system of colorimetry itself. Tristimulus values obtained in such a system could readily be converted to the exact tristimulus values of the I. C. I. system. The analyzer disc (371) may have additional filters for use in other determinations, if desired.

The vernier should enable the operator to read angles to one minute of arc. Ordinarily the semicircular arc is graduated in degrees.

The common construction materials used in scientific instruments are quite suitable for the present device. In the interest of saving in weight, the frame, supporting arms and other castings may be made of aluminum or magnesium alloys. Because of the ease of working, etc., brass is especially well adapted for the manufacture of the arcuate track. German silver is preferred for the graduated scales, verniers, knobs, and the like. The housing is satisfactorily constructed of thin steel with a baked coating.

One of the features which contributes greatly to the flexibility of the instrument and its advantages, is the slit arrangement in the receptor. In many types of determinations it is desirable to have the slit so narrow that it accepts for measurement only that light reflected from the sample which is parallel to the axis of the receptor. By having a series of slides with slits of different dimensions or graduated sizes supplied with the instrument, it is possible for the operator to vary the aperture sum (the sum of the angles subtended by filament and slit from the centers of their respective lenses) to adapt the instrument to the particular type of measurement to be made. No advantage has been found in having the receptor slit smaller than the filament (light source) angle.

Another advantage of the present instrument is that the source conversion filters are separate from the tristimulus filters, thereby permitting one to determine whether or not a match is obtained under widely different illuminants. Other advantages are that the tristimulus filters are so adjusted as to give I. C. I. values, or a very close approximation thereof, directly, without calculations, and that the slit arrangement used in conjunction with the R. P. Cargeille body tubes is one which enables the use of such tubes without their acting as cylindrical lenses, and which limits the light to the thickest portion of the tube.

Many advantages of the compensating photoelectric cell circuit with the photoelectric cells joined in opposing parallel connection, will be apparent to the workers in that field. In particular, the arrangement of decades with the extra decade ganged with one of the others to keep the external resistance with respect to the measuring photoelectric cell current constant, enables the operator to obtain much more accurate data than has heretofore been the case. This circuit not only permits the measurement of the short circuit current from the measuring cell, but it also maintains a constant external resistance as far as the measuring cell is concerned. Thus great linearity between the illumination on the measuring cell and the readings of the decade resistance is obtainable.

As many apparently widely different embodiments of this invention may be made without departing from the spirit and scope thereof, it is to be understood that this invention is not limited to the specific embodiments thereof except as defined in the appended claims.

I claim:

1. In an instrument for evaluating photoelectrically the light reflected from a surface, a support having an outer face for providing a plane in which to dispose the surface, said support having an aperture therethrough opening inwardly from said face, a light source, a collimator disposed to direct light from said source within the area of said aperture, means for mounting said collimator for movement arcuately in a plane perpendicular to the plane of said surface, a light receptor, means for mounting said receptor for movement arcuately in said plane and independently of said collimator and light source, the center of the light source and receptor arcuate paths being in the plane of said surface and within the area of said aperture, said light source being mounted to direct light through said collimator toward said aperture, an arcuate portion of said support disposed in a plane perpendicular to said outer face and extending inwardly for supporting the outer ends of said collimator and receptor, the center of curvature of said arcuate portion being in the plane of said surface, an intermediate support disposed between said arcuate portion and said surface having a bearing surface in a plane perpendicular to said face for supporting the inner ends of said collimator and receptor, said arcuate portion being formed with an arcuate track at its outer edge and with a radial flange projecting outwardly from said track, bearing members mounted on the collimator and receptor and disposed on each side of the collimator and on each side of the receptor, said bearing members being disposed to bear against said track and flange, an inner bearing member on each of said collimator and receptor disposed for bearing engagement with the surface of said intermediate support, and means for maintaining said bearing members in bearing engagement with said supports.

2. In a device of the kind described comprising a collimator disposed to project light on a surface to be tested, a support mounted on and at the rear of said collimator, a light source mounted in said support in the longitudinal axis of said collimator, a light regulator mounted on said support and a photoelectric cell mounted in back of said regulator for receiving light from said light source; said light regulator comprising an outer fixed apertured member facing the light source, a transparent interior diffuser facing the cell and a transparent heat-absorbing member disposed between said diffuser and said outer apertured member, means disposed between said outer apertured member and said heat-absorbing member for adjusting the light admitted to the heat-absorbing member which comprises a movable apertured member provided with openings varying in diminishing size from the opening in said fixed apertured member and means for disposing said openings successively between the light source and the heat-absorber, and an interior light regulator mounted between the heat-absorber and the diffuser which comprises a light obstructing member and means for moving the light obstructing member in front of said diffuser for varying the light admitted to said diffuser.

3. A device in accordance with claim 2 in which the heat-absorber is colored glass which is provided with a surface finish for diffusing the light transmitted therethrough.

4. A device in accordance with claim 2 in which the interior light regulator which is disposed between the heat-absorber and the interior diffuser comprises an opaque slide mounted for progressive movement over the area of the diffuser.

5. A device for evaluating the light reflected from a surface comprising a support having an outer face providing a plane in which to dispose the surface to be tested, a collimator and a light receptor having their axes in a plane intersecting the plane of said outer face, said collimator and receptor being movable angularly about a center in the plane of said outer face, an arcuate support comprising an arcuate bed disposed in a plane which is perpendicular to the plane of said outer face, said arcuate support being attached at its ends to said first named support, and an inner support attached to said first named support and disposed between said first named support and said arcuate support, said inner support having a bearing surface spaced from the plane of the axes of said collimator and receptor and being perpendicular to the plane of said outer face for providing a support for said collimator and receptor intermediately of said arcuate support and said outer face, said first named support being apertured through said outer face to provide an opening over which the surface to be examined is disposed, a carriage for said collimator having means for mounting the collimator with its axis directed radially of said arcuate bed, said collimator carriage having a part at its inner end in sliding engagement with the bearing surface of said inner support, a carriage for said light receptor having means for mounting the receptor with its axis directed radially of said arcuate bed, said receptor carriage having a part at its inner end in sliding engagement with the bearing surface of said inner support; means for mounting said collimator and receptor on said arcuate bed for independent rotation of each about a line passing through the surface to be tested, said line being within the area of said opening and perpendicular to the plane of said arcuate bed, the axes of said collimator and receptor being in a plane parallel to the plane of said arcuate bed, and means carried by the collimator and receptor carriages engaging the arcuate bed for causing the collimator and receptor to follow the curvature of the bed.

6. A device for evaluating the light reflected from a surface comprising a support having an outer face providing a plane in which to dispose the surface to be tested, a collimator and a light receptor having their axes in a plane intersecting the plane of said outer face, said collimator and receptor being movable angularly about a center in the plane of said outer face, an arcuate support comprising an arcuate bed disposed in a plane which is perpendicular to the plane of said outer face, said arcuate support being attached at its ends to said first named support, and an inner support attached to said first named support and disposed between said first named support and said arcuate support, said inner support having a bearing surface spaced from the plane of the axes of said collimator and receptor and being perpendicular to the plane of said outer face for providing a support for said collimator and receptor intermediately of said arcuate support and said outer face, said first named support being apertured through said outer face to provide an opening over which the surface to be examined is disposed, said collimator mounted with its axis directed radially of said arcuate bed and having an extension which is supported at its inner end in sliding engagement with the bearing surface of said inner support, said light receptor mounted with its axis directed radially of said arcuate bed and having an extension which is supported at its inner end in sliding engagement with the bearing surface of the inner support; means for mounting said collimator and receptor on said arcuate bed with their axes directed along different radii toward said opening for independent rotation of each about a line passing through the surface to be tested, said line being within the area of said opening and perpendicular to the plane of said arcuate bed, the axes of said collimator and receptor being in a plane parallel to the plane of said arcuate bed, said arcuate bed comprising a surfaced portion in sliding engagement with the means for mounting the collimator and receptor thereon and an arcuate flange projecting radially beyond its outer margin, the outer edge of the arcuate bed and the adjoining surface of the flange being surfaced to form an arcuate undercut track having one surface parallel with the said surfaced portion of the bed and another surface at an angle thereto, said means for mounting the collimator and receptor comprising members on said collimator and receptor for supporting them on said surfaced portion of the arcuate bed, bearing members on said supporting members bearing on the angularly related surfaces of said track, and means to retain the bearing members on said surfaces for causing the collimator and receptor to follow the curvature of the bed.

7. A device in accordance with claim 5 in which each of the means for mounting the collimator and receptor on the arcuate bed comprises a member engaging the arcuate bed and means for drawing said member into clamping engagement with said bed for retaining the collimator and receptor in adjusted positions.

8. A device in accordance with claim 6 in which said retaining means comprises tension members between said first named support and said collimator and receptor mountings, said tension members being disposed radially of said arcuate bed, means for attaching the tension members to the collimator and receptor mountings with the collimator and receptor between said arcuate bed and the attaching means, and means for attaching the tension members to a portion of said first named support, whereby the tension members urge the extensions of the collimator and light receptor mountings into contact with the bearing surface of the inner support and the bearing members into contact with said undercut track of the arcuate bed.

WILLIAM E. SCOTT.